United States Patent [19]

Coffey

[11] Patent Number: 5,489,081
[45] Date of Patent: Feb. 6, 1996

[54] SAFETY BRACKET FOR TABLE TOP MOUNTING OF A CENTRIFUGE

[75] Inventor: Robert G. Coffey, Campbell, Calif.

[73] Assignee: Beckman Instruments, Inc., Fullerton, Calif.

[21] Appl. No.: 154,618

[22] Filed: Nov. 17, 1993

[51] Int. Cl.⁶ .................................................. F16M 13/00
[52] U.S. Cl. ........................... 248/603; 248/300; 248/675
[58] Field of Search ...................................... 248/604, 607, 248/605, 603, 612, 638, 300, 675, 610

[56] References Cited

U.S. PATENT DOCUMENTS

| | | | |
|---|---|---|---|
| 1,086,442 | 2/1914 | Cornelius | 248/909 X |
| 3,065,941 | 11/1962 | Loftis | 248/604 |
| 3,502,290 | 3/1970 | Legrand et al. | 248/638 X |
| 3,506,226 | 4/1970 | Blomgren | 248/604 |
| 4,079,882 | 3/1978 | Mizuyoshi et al. | 248/638 |
| 4,282,566 | 8/1981 | Newman | 248/605 X |
| 4,492,357 | 1/1985 | Morrill | 248/300 X |
| 5,190,251 | 3/1993 | Bodo | 248/73 |
| 5,205,374 | 4/1993 | Love et al. | 248/638 X |

Primary Examiner—Karen J. Chotkowski
Attorney, Agent, or Firm—William H. May; P. R. Harder; Schneck & McHugh

[57] ABSTRACT

A bracket for shock mounting of a vibrating or rotating device, such as a centrifuge, to a support surface. The bracket is formed from a plate of stiff material, such as steel, having an expandible deformable section along a lengthwise axis of the plate and a rotationally deformable leg section formed by undulations in the plate from one end to the other. At narrower plate regions, formed by the undulations, plate rotation is possible until the plate exceeds its elastic limit in the rotational direction and permanent deformation occurs. Such permanent deformation absorbs energy from accidents within the device in which energy would otherwise be transferred to a support surface and the surrounding environment.

15 Claims, 3 Drawing Sheets

SAFETY BRACKET FOR TABLE TOP MOUNTING OF A CENTRIFUGE

TECHNICAL FIELD

The invention relates to safety mountings for a table top spinning or vibrating device, such as a centrifuge.

BACKGROUND ART

Benchtop instruments which vibrate and spin can sometimes work themselves loose from table top mountings and crash upon users or upon delicate laboratory equipment. Of particular concern are centrifuges which store large amounts of rotational energy in ordinary operation. If a centrifuge spindle or rotor fails, a centrifuge rotor must dissipate large amounts of energy to a storage container which, in turn, transfers energy through its mountings to a table top. Standards have been developed, for example, by the International Electrotechnical Commission for Most Credible Accident (MCA) Tests. According to one safety specification, IEC 1010-2, an instrument undergoing an MCA test must stay within a 300 millimeter envelope and the instrument door must stay closed.

A bracket in accord with the prior art is shown in FIG. 3. A generally triangular plate 12 has an apex 14 with an aperture 16 through which a bolt 18 passes for connection with a table top, sometimes also passing through a grommet 20, a centering sleeve 22 and a washer 24. At the base of the triangular plate 12 a pair of bolts, such as bolt 26 passes through opposite apertures 28 and 30 to fasten plate 12 to an instrument such as a centrifuge. In the event of an accident, the plate merely transfers energy from the instrument directly to the table top with a slight amount of cushioning or shock absorption by means of grommet 20.

An object of the present invention was to satisfy the above-identified safety standard, while providing a mounting bracket which is simple and compact.

SUMMARY OF THE INVENTION

The above object has been achieved with a bracket which provides shock mounting for a centrifuge or the like by providing a plate which has a longitudinal extension or expansion axis and a rotation axis with a center on or near the longitudinal axis. Undulations along the plate periphery allow formation of different plate sections having energy absorption characteristics in different directions. Along the extension axis there is provided a head section for fastening to a surface tapering down to a neck and then widening to a shoulder section which is longitudinally extendible and deformable. The shoulder section narrows down to a trunk and then widens to a torso section which features lateral outstretched leg members which are rotationally bendable about a point near the lengthwise axis to an extent before permanently deforming. Transitions between sections require radii in the plate periphery to allow a smooth change in force distribution and to prevent a plate fracture. The extendible shoulder section and the bendable torso or leg sections can absorb vibration and rotation to dampen and absorb energy which would otherwise be transferred to a support surface from a vibrating or twisting instrument mounted thereon. Further energy transfer is possible until the plate permanently deforms. In permanently deforming, the plate will absorb a shock load from the table top instrument thereby dissipating energy and preventing a significant amount of energy transfer to the table top supporting the instrument.

BEST MODE FOR CARRYING OUT THE INVENTION

Figure 1:
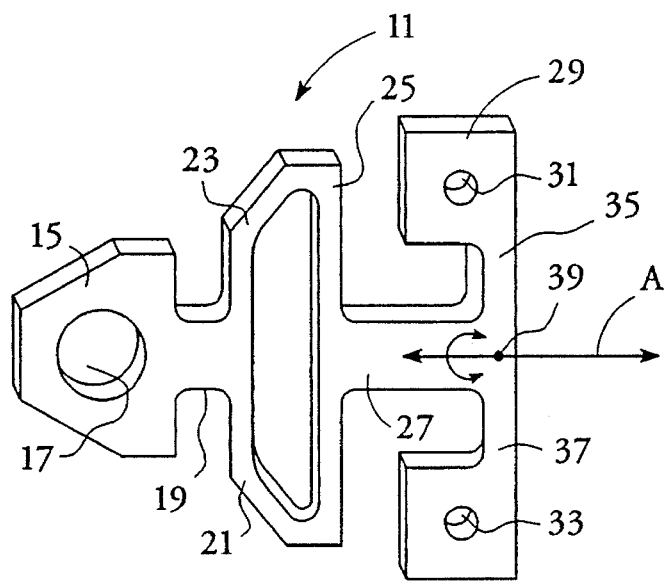
FIG. 1 is a top perspective view of a safety bracket in accord with the present invention.
Figure 3:
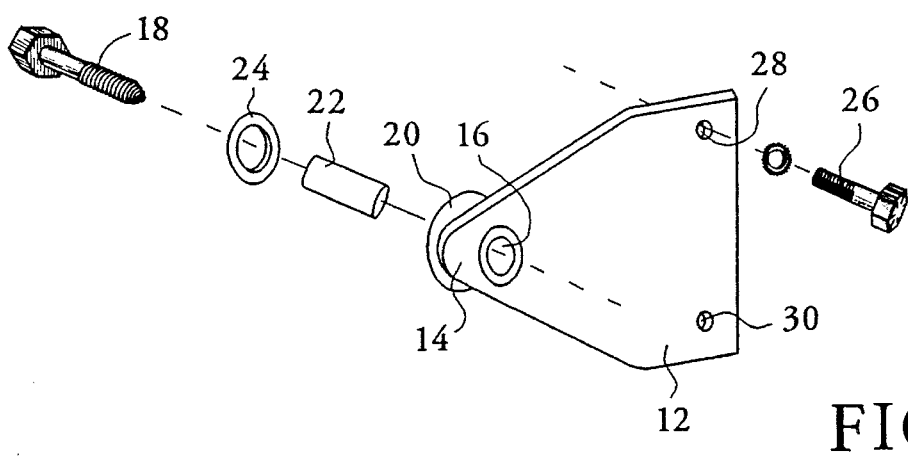
FIG. 3. is a conventional bracket of the prior art.

With reference to FIG. 1 a safety bracket 11 of the present invention consists of a steel plate, approximately 2 to 3 millimeters thick having a head section 15 with a central aperture 17 for passage of a screw or bolt therethrough for connection with a table top in a manner illustrated with regard to the prior art plate of FIG. 3. The width of the head section at its widest point is about 38 millimeters, while the height of this section is about 29 millimeters. The neck 19, being about 9 millimeters wide connects the head section to a shoulder section 21 having relatively thin spaced apart sides 23 and 25, forming a loop, to allow extension between the opposed sides in the axial direction, defined by a longitudinal axis of symmetry, indicated by arrows A. The shoulder section is connected to a trunk 27 and then to a torso section 29 which cantilevers outwardly from the trunk. The trunk and head have about the same width, while the shoulders and torso are significantly wider, the torso extending slightly beyond the maximum width of the shoulder section. The torso section includes opposed holes 31 and 33 for mounting the torso section to an instrument such as a centrifuge. The torso section has cantilever or outwardly directed leg spans 35 and 37 of reduced width, about 5 millimeters, for allowing bending of the bracket about a point 39 on the axis of symmetry or other points near the axis of symmetry. Bending of leg members 35 and 37 dissipates twisting forces until the elastic limit of the members is overcome and the members permanently deform. At the same time, a portion of the bracket extends, storing a component of energy.

Figure 2:
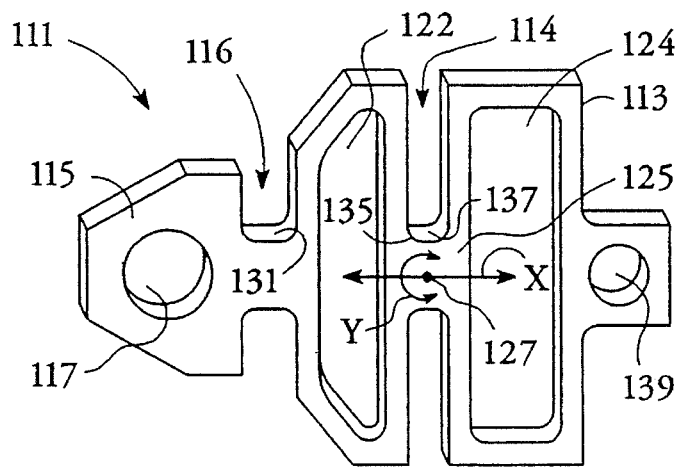
FIG. 2 is a top perspective view of an alternate embodiment of the bracket illustrated in FIG. 1.

With reference to FIG. 2 a plate or bracket 111 is seen which is similar in shape to the bracket of FIG. 1. Plate 111 is characterized by a wide base edge 113 which is the portion of the plate which is mounted to a vibrating or twisting instrument to be supported. The perimeter of the plate has undulations 114 and 116 ending in a narrow head section 115 with a central aperture 117 forming a means for mounting to a support surface in conjunction with a screw or similar fastener. Undulations 114 and 116 are symmetric about a lengthwise axis, indicated by the line X. The plate features a pair of cutout regions 122 and 124 with narrow rims of plate material compared to other plate areas, which are laterally symmetric with respect to the lengthwise axis, X, and are located between the head section 115 and the edge 113. Typical axial stiffness of the plate or bracket ranges between 2,000–50,000 lbs. per inch and preferably 5,000–20,000 lbs. per inch. The plate is axially extendible along the X axis because the plate material surrounding the cutout regions has a reduced width, on the order of a few millimeters. By extending, the plate stores energy like a bow. The overall length of the plate is about 9 centimeters and the thickness of the plate is between 2 and 3 millimeters. The plate is fabricated from stock steel sheet material.

Figure 4:
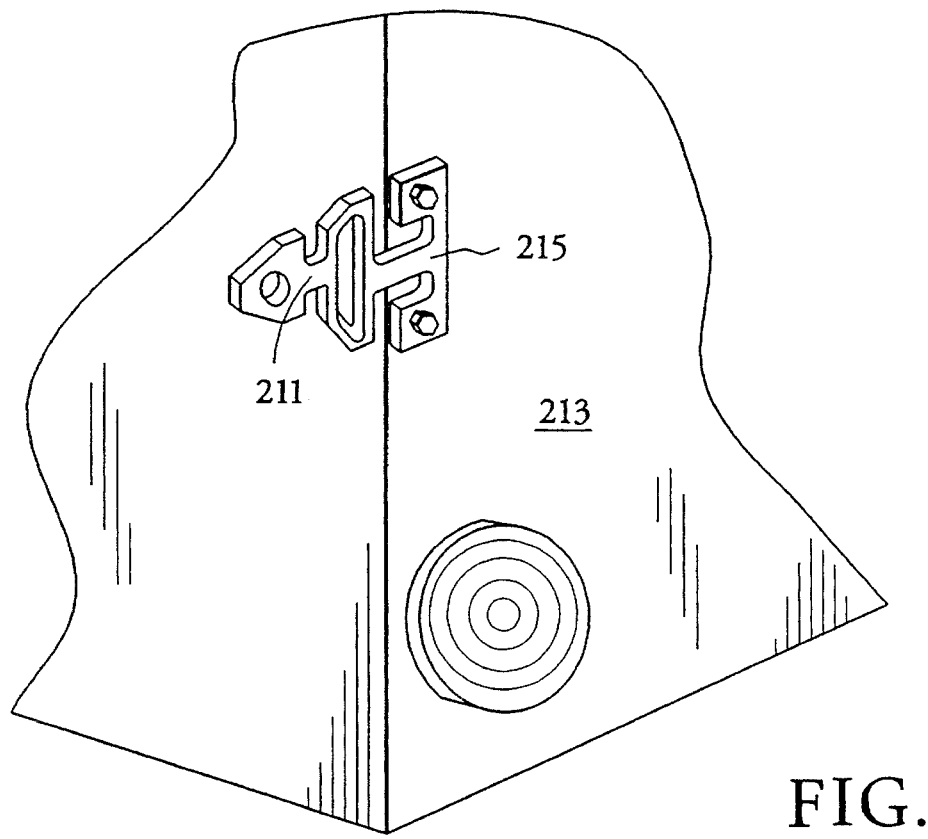
FIG. 4 is a perspective view of a portion of a table top instrument having a safety bracket in accord with the present invention mounted thereon.

With reference to FIG. 4, a safety bracket in accord with the present invention 211 is shown mounted on a table top instrument 213. The wider portion 215 of the bracket is mounted to the instrument and the head portion is cantilevered outwardly for connection to a support surface such as a table top.

Figure 5:
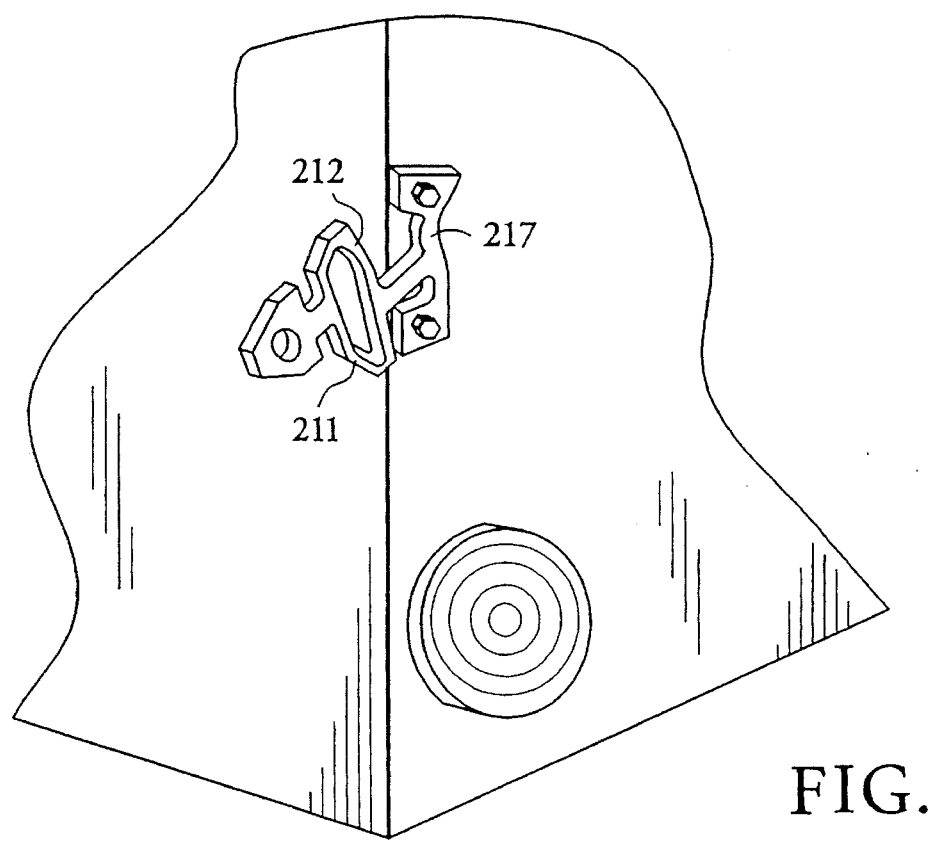
FIG. 5 is a perspective view of the apparatus of FIG. 4 after an accident in which the bracket has deformed.
Figure 6A:
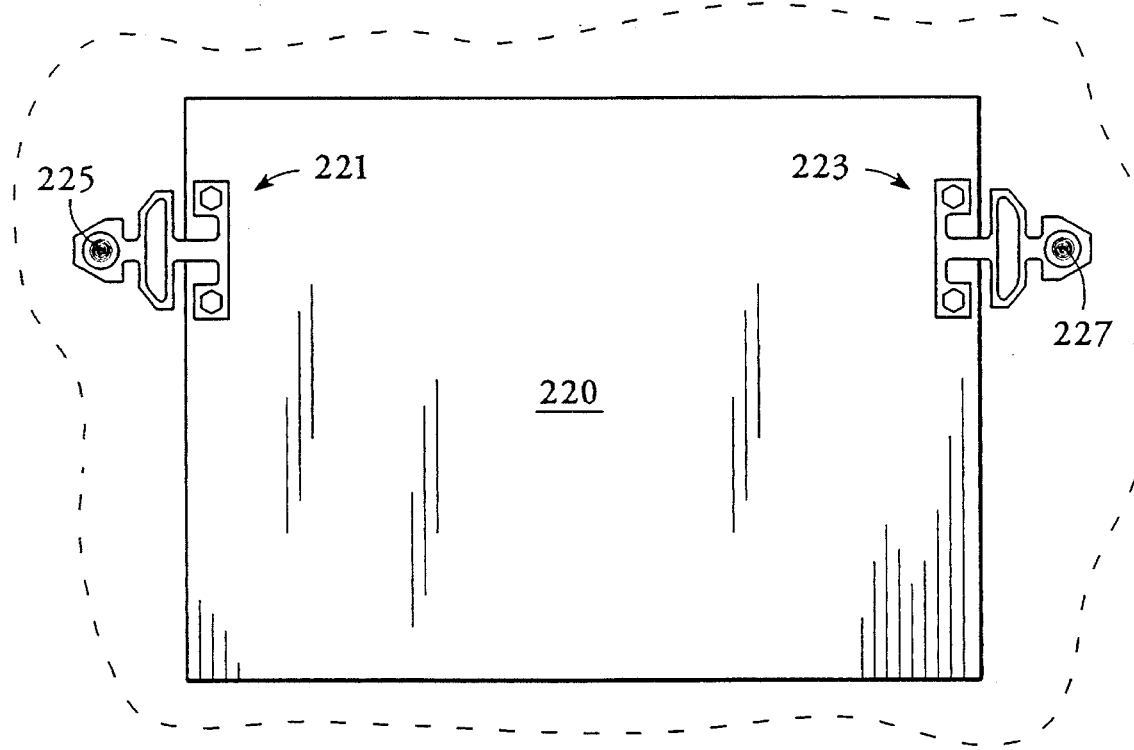
FIGS. 6a and 6b are operational bottom plan views of a table top instrument having a pair of safety brackets in accord with the present invention before and after an accident, respectively.
Figure 6B:
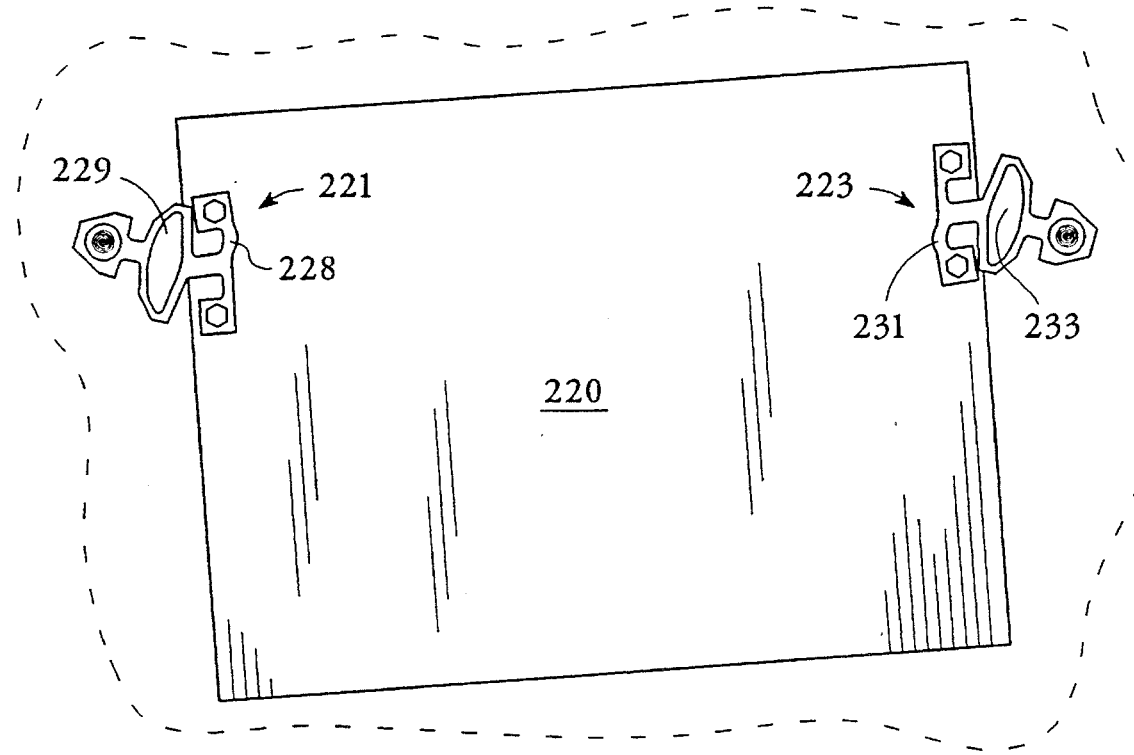

In FIG. 5, the same bracket 211 is shown having been deformed in an accident whereby permanent deformation has occurred in a torso section 217, with permanent bending of the bracket. Besides the deformation in the torso section, there has been some expansion of the shoulder section 212. This expansion stores energy in the form of potential energy until the shoulder section is permanently deformed. This may be seen in FIGS. 6a and 6b which show a pair of opposed brackets 221 and 223 attached to the bottom of a table top instrument 220 which in turn has been attached to the table top 222 by means of screws 225 and 227 threaded into the table top. So long as the centrifuge operates normally, the bottom or base of the centrifuge will appear as in FIG. 6a. However, in the event of an accident involving a transfer of energy from the instrument, the base of the instrument 220 is shown to have rotated somewhat in a counterclockwise direction. This has resulted in a permanent deformation in the torso section 228 and an expansion of shoulder section 229 of bracket 221. Similarly, with respect to bracket 223 there has been a corresponding deformation of torso section 231 and an expansion of the shoulder section 233, which may be a deformation. The two identical brackets resist a rotational shock load by stretching each bracket as a two force member spring. The advantage is that the bracket's stiffness only needs to be designed for the axial direction. In permanently deforming, each bracket will absorb a shock load from the table top instrument, thereby dissipating energy and preventing a significant amount of energy transfer to the table top supporting the instrument.

By absorbing shock, a table top instrument, such as a centrifuge is not only restrained from motion relative to the table top, but also the door of the device tends to remain latched because the level of shock needed to open the door accidentally, i.e. the predetermined maximum acceptable shock load before opening, is not reached.

I claim:

1. A safety bracket for restraining dislocation of a vibrating or twisting table top instrument relative to a support surface, the bracket comprising:

a plate having a head section connected to a neck, in turn connected to a shoulder section, in turn connected to a trunk, in turn connected to a torso section, the neck and trunk being laterally narrower than said head, shoulder and torso sections and serving to join adjacent sections aligned along a lengthwise axis, said shoulder section being an elongated loop laterally symmetric with respect to the lengthwise axis and which is extendible in the lengthwise direction to an extent before permanently deforming and said torso section being rotationally bendable about a point on the lengthwise axis to an extent before permanently deforming, said head section having means for mounting to a support surface and said torso section having means for mounting to a portion of a vibrating or twisting table top instrument.

2. The bracket of claim 1 wherein said torso section comprises a pair of legs extending outwardly from said lengthwise axis in opposite directions.

3. The bracket of claim 2 wherein said means formounting said head sectin comprises an aperture defined in said head section and said means for mounting said torso section comprises a pair of spaced apart apertures defined in said opposed legs.

4. The bracket of claim 1 wherein said torso section comprises a second loop which is extendible in the lengthwise direction.

5. The bracket of claim 4 wherein said means for mounting said head section comprises a first aperture defined in said head section and said means for mounting said torso section comprises a second aperture along the lengthwise axis distal to the first aperture.

6. The bracket of claim 1 wherein said bracket is symmetric about said lengthwise axis.

7. The bracket of claim 1 wherein said head section has a truncated triangular shape.

8. The bracket of claim 1 wherein said neck and trunk have equal widths.

9. A safety bracket for restraining dislocation of a vibrating or twisting table top instrument relative to a support surface, the bracket comprising, a plate having a wide base edge undulating to a narrow head section about a lengthwise axis, the wide edge having means for mounting to a side of a vibrating or twisting table top. instrument and the narrow head section having means for mounting to a support surface, a deformable, elongated, cut-out region laterally symmetric with respect to the lengthwise axis, between the head section and said wide edge allowing axial expansion of the plate, and a rotationally deformable plate section bordering undulations between the head section and said wide edge with a center of rotation along the lengthwise axis.

10. The bracket of claim 9 wherein said cut-out region comprises a loop of plate material symmetric about the lengthwise axis.

11. The bracket of claim 9 wherein said cut-out region comprises first and second loops of plate material separated by a narrower rotationally deformable trunk of plate material, the loops being symmetric about the lengthwise axis.

12. The bracket of claim 9 wherein said rotationally deformable plate section comprises a pair of legs outwardly extending in opposite directions from the lengthwise axis.

13. A safety bracket for restraining dislocation of a centrifuge relative to an external support surface and for reducing shock load to a centrifuge door latch, the centrifuge being of the type haviinq an access door to a rotor containment cavity, said door beinq secured by a latch having a predetermined maximum acceptable shock load before opening, the bracket comprising:

a plate having a base edge spaced from a head section along a lengthwise axis, the base edge having means for mounting to a side of the centrifuge and the head section having means for mounting to a support surface, and a cut-out plate region between said base edge and said head section defining an aperture having lateral end portions on opposite sides of said lengthwise axis, said end portions being defined by laterally extending narrow rims of plate material, said rims having an axial stiffness along said lengthwise axis such that permanent deformation of said plate rims during a rotor failure reduces the shock load transmitted to said centrifuge, including the door latch, to a value less than said maximum acceptable shock load.

14. The bracket of claim 13 wherein said plate structure has an axial stiffness of from about 2,000 lbs per inch to about 50,000 lbs per inch.

15. The bracket of claim 13 wherein said plate structure has an axial stiffness of from about 5,000 lbs per inch to about 20,000 lbs per inch.

* * * * *